United States Patent [19]

Lee

[11] Patent Number: 5,438,438
[45] Date of Patent: Aug. 1, 1995

[54] APPARATUS FOR SYNTHESIZING VIDEOS

[75] Inventor: Kwang Y. Lee, Kyungki, Rep. of Korea

[73] Assignee: Goldstar Co., Ltd., Seoul, Rep. of Korea

[21] Appl. No.: 68,686

[22] Filed: May 27, 1993

[30] Foreign Application Priority Data

May 29, 1992 [KR] Rep. of Korea ............... 9314/1992
May 29, 1992 [KR] Rep. of Korea ............... 9315/1992

[51] Int. Cl.$^6$ ............... H04N 1/387; H04N 5/272; H04N 5/275
[52] U.S. Cl. ............... 358/537; 358/540; 358/452; 358/462; 348/586; 348/589; 348/590
[58] Field of Search ............... 358/540, 537, 530, 527, 358/529, 452, 450, 448, 468, 462, 311; 348/586, 589, 584, 590; 360/14.1

[56] References Cited

U.S. PATENT DOCUMENTS

4,322,157 3/1982 Miura et al. ............... 358/452
4,733,304 3/1988 Homma et al. ............... 358/452

Primary Examiner—Scott A. Rogers
Attorney, Agent, or Firm—Fliesler, Dubb, Meyer & Lovejoy

[57] ABSTRACT

An apparatus and a method for synthesizing videos in a color video printer, in which videos can variously be edited and characters can simply be inserted into a video, according to a user's selection. The present apparatus comprises a video signal processing circuit for separating a color signal from an input composite video signal, converting the separated color signal into a digital color signal, again converting the digital color signal into an analog color signal and encoding the analog color signal into a composite video signal, a signal input unit for inputting a plurality of mode signals and edit information, a control circuit for outputting a plurality of control signals so that the operation of the apparatus can be performed corresponding to the mode signals and edit information from the signal input unit, a storage unit for storing the digital color signal from the video signal processing circuit and the edit information from the signal input unit under the control of the control circuit, a monitor for displaying the composite video signal from the video signal processing circuit and the input composite video signal on a screen thereof under the control of the control circuit, and a printing circuit for printing an output signal from the storage unit under the control of the control circuit.

5 Claims, 4 Drawing Sheets

VIDEO A

FIG.4B

VIDEO B

VIDEO B
VIDEO A

FIG.7

SUNRISE

APPARATUS FOR SYNTHESIZING VIDEOS

BACKGROUND OF THE INVENTION

1. Field of the Invention

The present invention relates fin general to a color video printer, and more particularly to an apparatus and a method for synthesizing videos in a color video printer, in which videos to be edited and characters to be inserted into a video can readily be positioned, so that an editing function can be performed variously.

2. Description of the Prior Art

Figure 1:
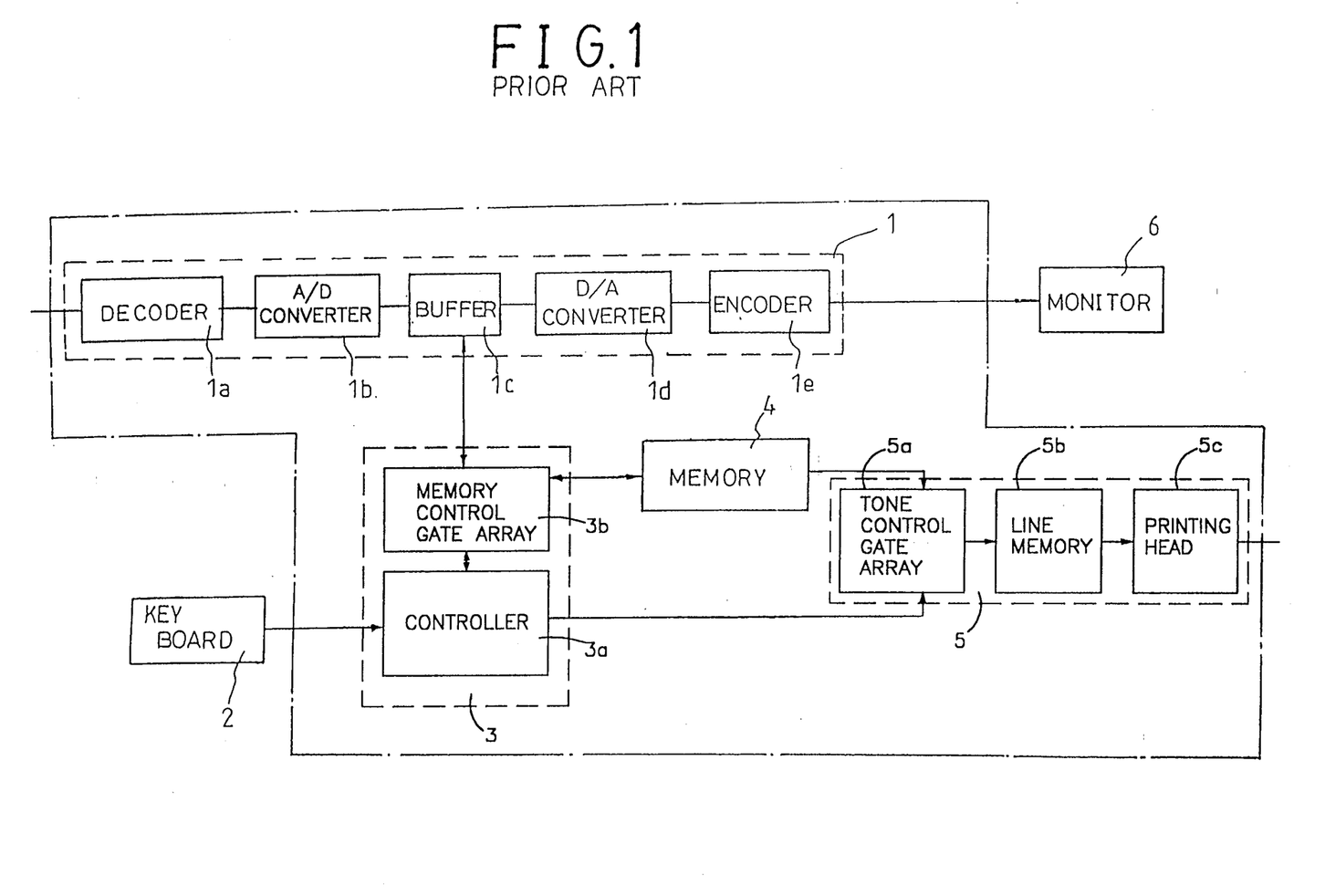
FIG. 1 is a block diagram of a conventional color video printer.

Referring to FIG. 1, there is shown in a conventional color video printer in a block diagram. As shown in this drawing, the conventional color video printer comprises a video signal processing circuit 1 with a decoder 1a, an analog/digital (A/D) converter 1b, a buffer 1c, a digital/analog (D/A) converter 1d and an encoder 1e. The video signal processing circuit 1 is adapted to convert a color signal of an input composite video signal into a digital color signal or a color difference signal (commonly referred to hereinafter as the color signal), store the digital color signal in a memory 4 and again convert the digital color signal into an analog color signal. A keyboard 2 is provided to select various modes.

The conventional color video printer also comprises a control circuit 3 having a controller 3a and a memory control gate array 3b. The control circuit, 3 is adapted to output a plurality of control signal s so that the operation of the color video printer can be performed corresponding to mode select signals from the keyboard 2. The memory 4 stores the digital, color signal from the buffer 1c of the video signal processing circuit 1.

The conventional color video printer also comprises a printing circuit 5 with a tone control gate array 5a, a line memory 5b and a printing head 5c. The printing circuit 5 is adapted to print the digital color signal stored in the memory 4.

A monitor 6 is connected to an output of the video signal processing circuit 1 to display the composite video signal from the video signal processing circuit 1 on a screen thereof.

The video signal processing circuit 1, the control circuit 3, the memory 4 and the printing circuit 5 are mounted in the color video printer.

The operation of the conventional color video printer with the above-mentioned construction will hereinafter be described.

First, in the video signal processing circuit 1, the color signal is separated from the input composite video signal by the decoder 1a and then converted into the digital color signal by the analog/digital converter 1b. The color signal from the analog/digital converter 1b is buffered by the buffer 1c and then converted into the analog color signal by the digital/analog converter 1d. The analog color signal from the digital/analog converter 1d is encoded the composite video signal by the encoder 1e, which applies the composite video signal to the monitor 6. As a result, the composite video signal from the encoder 1e is displayed on the screen of the monitor 6.

At this time, if the user first selects a STORE mode through the keyboard 2 to print a desired picture, the controller 3a in the control circuit 3 outputs the control signal so that the operation of the color video printer can be performed in the STORE mode. The control signal from the controller 3a is applied to the buffer 1c in the video signal processing circuit 1 through the memory control gate array 3b in the control circuit. 3. As a result, in response to the applied control signal, the digital color signal from the buffer 1c is stored into the memory 4.

If the user then selects a PRINT mode through the keyboard 2 to print the desired picture, the controller 3a in the control circuit 3 outputs the control signal so that the operation of the color video printer can be performed in the PRINT mode. In response to the control signal from the controller 3a, the digital color signal stored in the memory 4 is applied through the tone control gate array 5a to the line memory 5b. The applied digital color signal is temporarily stored in the line memory 5b in the unit of line. Then, the digital color signal stored in the line memory 5b is printed through the printing head 5c.

However, the conventional color video printer has a disadvantage, in that it simply prints only a desired one of the input composite video signals. In other words, in the case where desired videos are to be edited or characters are to be inserted into the videos before printing, the desired videos must be super-imposed in a separate video machine such as a camcorder or a video cassette recorder (VCR) having a super-impose function and the resultant, edited video then be applied to the color video printer. The edited video is stored and printed in the color video printer. These result in a complexity and an inconvenience. Also, when the user selects a video stored in the memory, the video reproduced from the camcorder or the VCR cannot be displayed on the screen of the monitor. In this case, the user has to manually operate the camcorder or the VCR to view the reproduced video, with an inconvenience.

SUMMARY OF THE INVENTION

Therefore, the present invention has been made in view of the above problems, and it is an object of the present invention to provide an apparatus and a method for synthesizing videos in a color video printer, in which videos can variously be edited and characters can simply be inserted into a video, according to a user's selection, It is another object of the present invention to provide an apparatus and a method for synthesizing videos in a color video printer, in which a video selected in the color video printer and a video reproduced from a different video machine can be displayed simultaneously on a screen of a monitor.

In accordance with one aspect of the present invention, there is provided an apparatus for synthesizing videos, comprising: video signal processing means for separating a color signal from an input composite video signal, converting the separated color signal into a digital color signal, again converting the digital color signal into an analog color signal and encoding the analog color signal into a composite video signal; signal input means for inputting a plurality of mode signals and edit information; control means for outputting a plurality of control signals so that the operation of the apparatus can be performed corresponding to the mode signals and edit information from said signal input means; storage means for storing the digital color signal from said video signal processing means and the edit information from said signal input means under the control of said control means; a monitor for displaying the composite video signal from said video signal processing means and the input composite video signal on a screen thereof under the control of said control means; and printing means for printing an output signal from said storage means under the control of said control means.

In accordance with another aspect of the present invention, there is provided a method of synthesizing videos, comprising: a storing step of discriminating whether a video to edited has been stored, discriminating whether a CHARACTER EDIT mode has been selected if it is discriminated that the video to be edited has been stored and displaying the stored video; a video editing step of discriminating whether a VIDEO EDIT mode has been selected and editing the video to be edited if it is discriminated that the VIDEO EDIT mode has been selected; a character editing step of discriminating whether character information has been inputted, inserting the character information into the video if it is discriminated that the character information has been inputted and displaying the resultant picture; and a confirming step of checking whether the user is satisfied with the resultant pictures in said video editing step and/or said character editing step and again inputting edit information if the user is not satisfied with the resultant pictures.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 2:
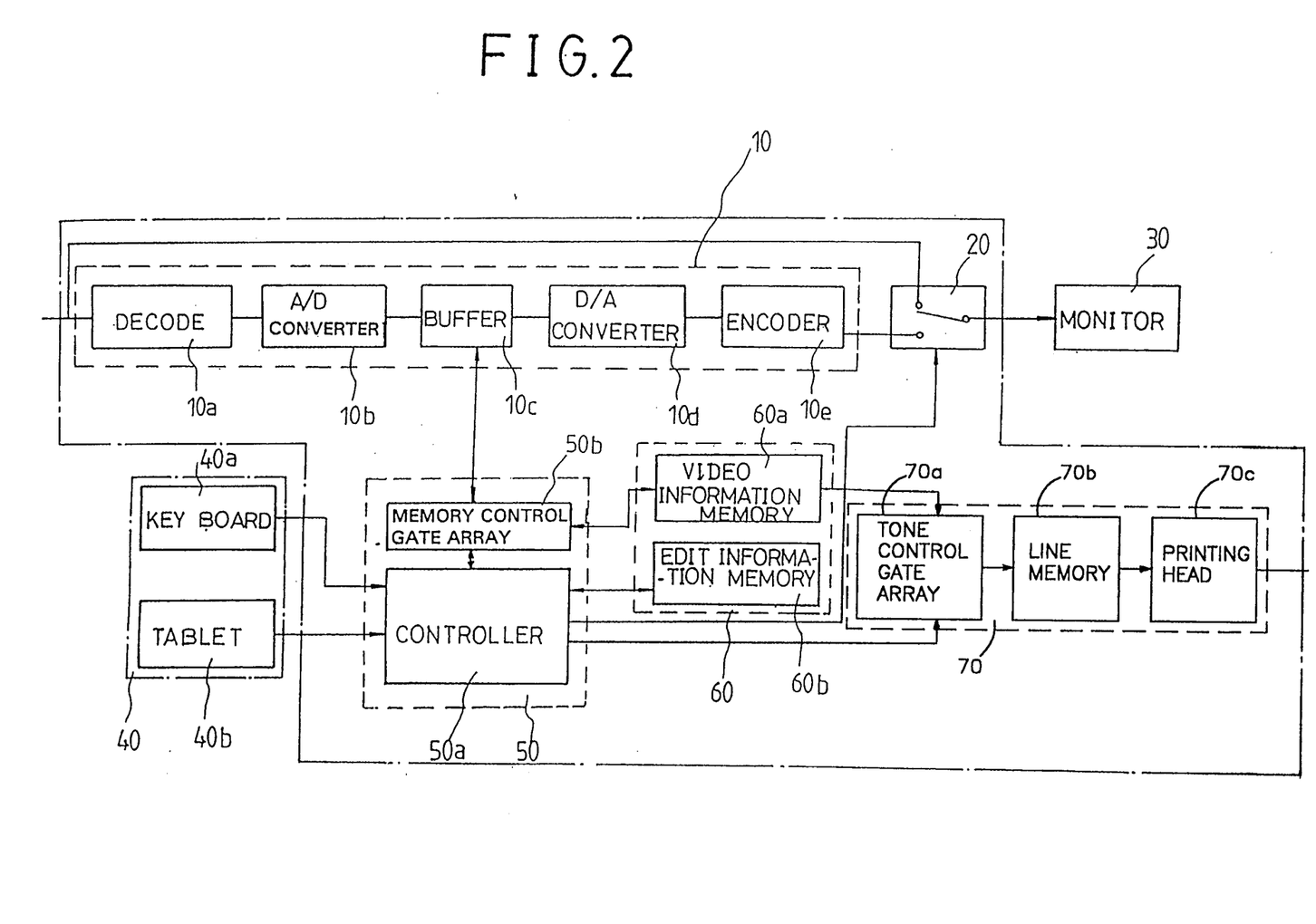
FIG. 2 is a block diagram of an apparatus for synthesizing videos in a color video printer in accordance with the present invention.

Referring to FIG. 2, there is shown a block diagram of an apparatus for synthesizing videos in a color video printer in accordance with the present invention. As shown in this drawing, the video synthesizing apparatus of the present invention comprises a video signal processing circuit 10 with a decoder 10a, an analog/digital (A/D) converter 10b, a buffer 10c, a digital/analog (D/A) converter 10d and an encoder 10e. The video signal processing circuit 10 is adapted to separate a color signal from an input composite video signal, convert the separated color signal into a digital color signal, again convert the digital color signal into an analog color signal and encode the analog color signal into a composite video signal.

The video synthesizing apparatus also comprises a switching circuit 20 for selectively outputting one of the input composite video signal and the composite video signal from the video signal processing circuit 10 so that the selected composite video signal can be displayed in a picture-in-picture (PIP) manner and a monitor 30 for displaying the composite video signal outputted from the switching circuit 20 on a screen thereof.

A signal input unit 40 is provided to input a plurality of mode signals and edit information. The signal input unit 40 includes a keyboard 40a and a tablet 40b. A control circuit 50 has a con%roller 50a and a memory control gate array 50b. The control circuit 50 is adapted to output a plurality of control signals so that the operation of the apparatus can be performed corresponding to the mode signals and edit information from the signal input unit 40.

A storage unit 60 is provided with a video information memory 60a and an edit information memory 60b. The storage unit 60 stores the digital color signal from the buffer 10c of the video signal processing circuit 10 and the edit information from the signal input unit 40 under the control of the control circuit 50.

The video synthesizing apparatus also comprises a printing circuit 70 with a tone control gate array 70a, a line memory 70b and a printing head 70c. The printing circuit 70 is adapted to print the digital color signal stored in the storage unit 60 under the control of the control circuit 50.

The edit information includes position information to which a desired video portion is to be moved, and character information to be inserted.

Figure 3:
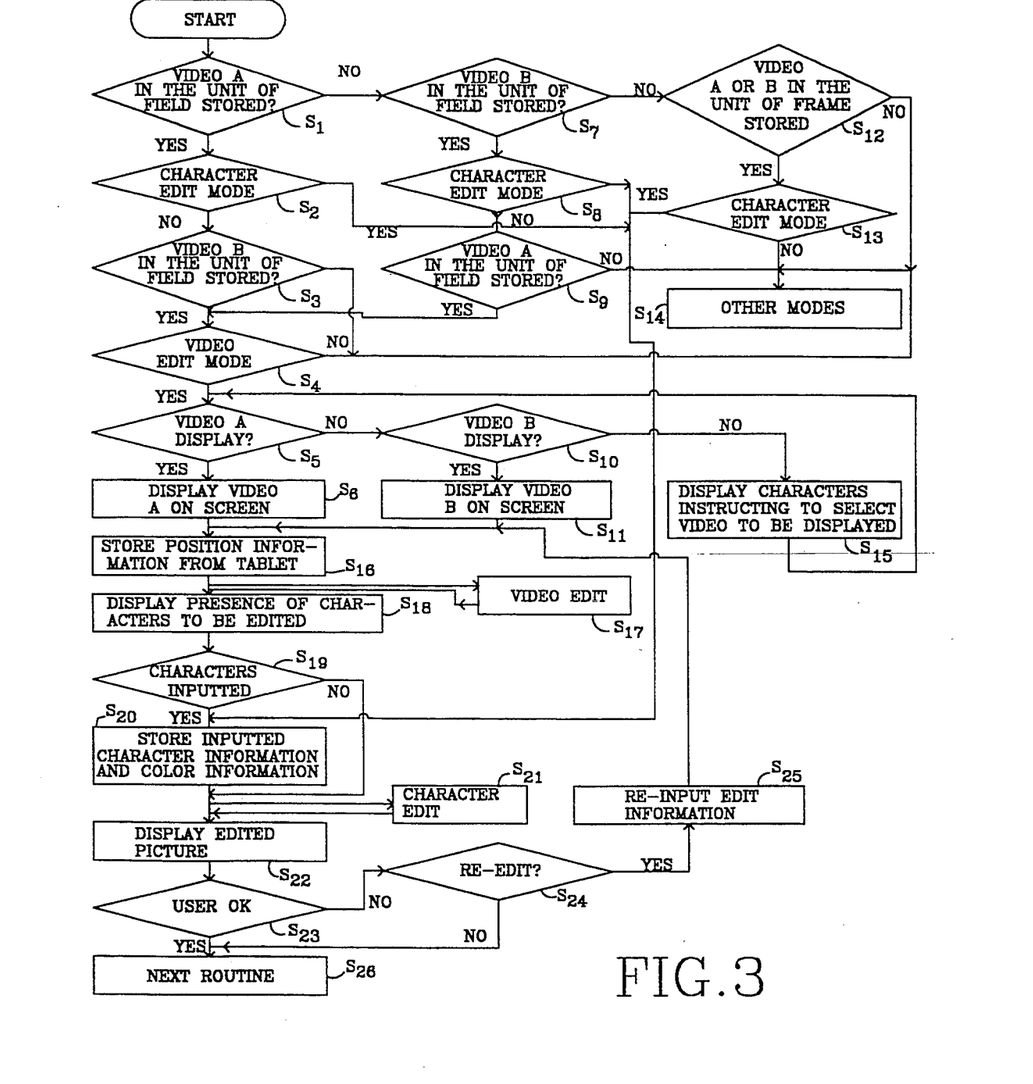
FIG. 3 is a flowchart illustrating a method of synthesizing videos in a color video printer in accordance with the present invention.

Referring to FIG. 3, there is shown a flowchart illustrating a method of synthesizing videos in a color video printer in accordance with the present invention. As shown in this drawing, the video synthesizing method of the present invention comprises a storing step (S1–S15) of discriminating whether a video to edited has been stored, discriminating whether a CHARACTER EDIT mode has been selected if it is discriminated that the video to be edited has been stored and displaying the stored video, a video editing step (S16 and S17) of discriminating whether a VIDEO EDIT mode has been selected and editing the video to be edited if it is discriminated that the VIDEO EDIT mode has been selected, a character editing step (S18–S22) of discriminating whether character information has been inputted, inserting the character information into the video if it is discriminated that the character information has been inputted and displaying the resultant picture, and a confirming step (S23–S26) of checking whether the user is satisfied with the resultant pictures in the video editing step and/or the character editing step and again inputting edit information if the user is not satisfied with the resultant pictures. On the other hand, when the CHARACTER EDIT mode is inputted after the storing step, the character editing step is performed.

Figure 4A:
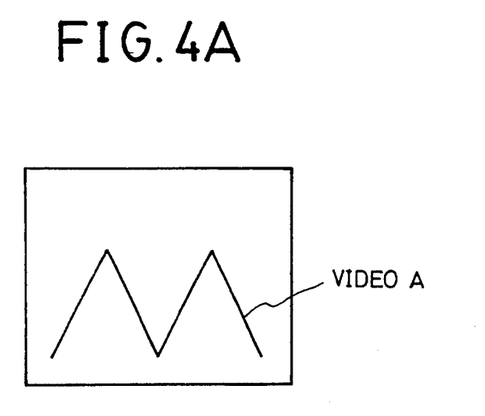
FIGS. 4A and 4B are views illustrating videos A and B displayed naturally on a screen of a monitor in accordance with an embodiment of the present invention, respectively.
Figure 4B:
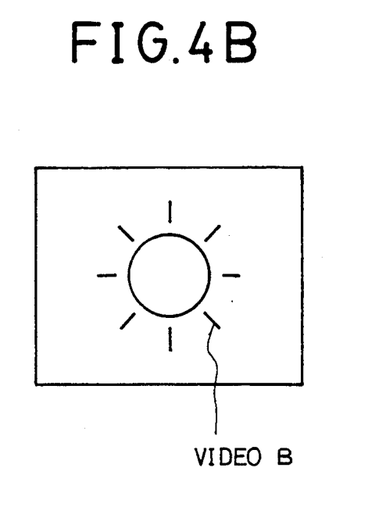
Figure 5:
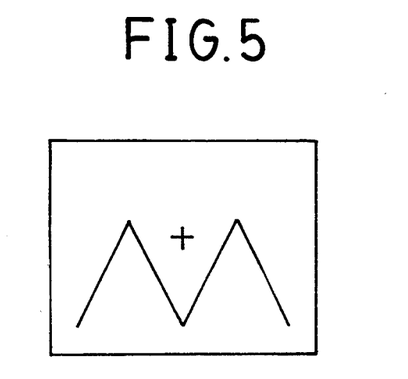
FIG. 5 is a view illustrating an edit position of the video A in FIG. 4A designated in accordance with the embodiment of the present invention.

FIGS. 4A and 4B are views illustrating videos A and B displayed naturally on the screen of the monitor in accordance which an embodiment of the present invention, respectively. FIG. 5 is a view illustrating an edit position of the video A in FIG. 4A designated in accordance with the embodiment of the present invention, FIG. 6 is a view illustrating a picture which is obtained by editing or synthesizing the videos A and B in FIGS.

Figure 6:
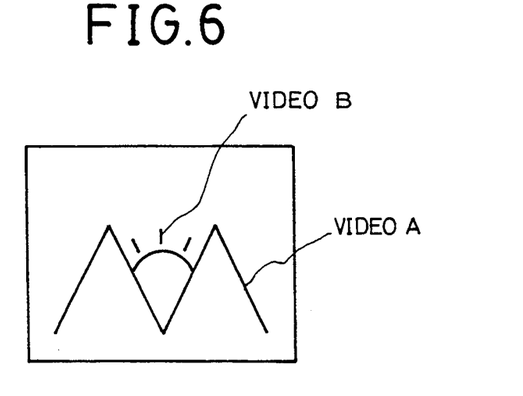
FIG. 6 is a view illustrating a picture which is obtained by editing or synthesizing the videos A and B in FIGS. 4A and 4B on the basis of the edit position of the video A shown in FIG. 5 in accordance with the embodiment of the present invention.
Figure 7:
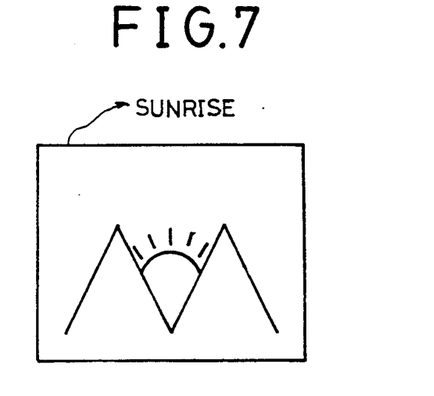
FIG. 7 is a view illustrating a picture which is obtained by inserting characters into the picture in FIG. 6 in accordance with the embodiment of the present invention.

4A and 4B on the basis of the edit position of the video A shown in FIG. 5 in accordance with the embodiment of the present invention; and FIG. 7 is a view illustrating a picture which is obtained by inserting characters into the picture in FIG. 6 in accordance with the embodiment of the present invention.

In operation, in the video signal processing circuit 10, the color signal is separated from the input composite video signal by the decoder 10a and then converted into the digital color signal by the analog/digital converter 10b. The digital color signal from the analog/digital converter 10b is buffered by the buffer 10c and then converted into the analog color signal by the digital-/analog converter 10d. The analog color signal from the digital/analog converter 10d is encoded into the composite video signal by the encoder 10e. One of the input composite video signal and the composite video signal from the encoder 10e is selected by the switching circuit 20 and then displayed on the screen of the monitor 30 in the PIP manner.

At this time, if the user selects a STORE mode through the keyboard 40a, the controller 50a in the control circuit 50 outputs the control signal so that the operation of the apparatus can be performed in the STORE mode. The control signal from the controller 50a is applied to the memory control gate array 50b in the control circuit 50. The memory control gate array 50b outputs the received control signal in a parallel manner, so as to shorten the time required in performing the STORE mode operation. The control signal from the memory control gate array 50b is applied to the buffer 10c of the video signal processing circuit 10. As a result, in response to the applied control signal, the digital color signal from the buffer 10c is stored into the video information memory 60a in the storage unit 60 through the memory control gate array 50b. At this time, the digital color signal or video signal is stored in the video information memory 60a in the unit of field or frame.

Thereafter, when position information and/or character information is inputted through the tablet or electronic pen 40b in the signal input unit 40, it is then applied to the controller 50a in the control circuit 50. Herein, the position information indicates a position to which the video stored in the video information memory 60a is intended to be moved, and the character information is characters to be inserted into the stored video.

The controller 50a outputs the control signal for the storage of the received position and/or character information. In response to the control signal from the controller 50a, the memory control gate array 50b receives the position and/or character information and then outputs it in the parallel manner. As a result, the position and/or character information from the memory control gate array 50b is stored into the edit information memory 60b in the storage unit 60.

Then, if the user selects an EDIT mode through the keyboard 40a in the signal input unit 40, the controller 50a in the control circuit 50 outputs the control signal so that the operation of the apparatus can be performed in the EDIT mode. In response to the control signal from the controller 50a, the position and/or character information stored in the edit information memory 50b is applied to the memory control gate array 50b, which then outputs the received position and/or character information to the video information memory 60a in the parallel manner. As a result, the stored video is edited based on the position and/or character information. The edited, resultant video is again stored in the video information memory 60a.

If the user then selects a PRINT mode through the keyboard 40a, the controller 50a in the control circuit 50 outputs the control signal so that the operation of the apparatus cap be performed in the PRINT mode. The control signal from the controller 50a is applied to the printing circuit 70 through the memory control gate array 50b.

That is, in the printing circuit 70, the tone control gate array 70a operates in response to the control signal from controller 50a, so that the digital color signal stored in the video information memory 60a is outputted in the parallel manner. The digital color signal outputted from the video information memory 60a is stored into the line memory 70b in the unit of line. Then, the digital color signal from the line memory 70b is printed through the printing head 70c.

The operation of storing and editing two videos A and B as an example will hereinafter be described with reference to FIGS. 3 to 7.

At the storing step (S1–S15) in FIG. 3, if it is discriminated that the STORE mode has been selected through the keyboard 40a in the signal input unit 40, the video A from the video signal processing circuit 10 in FIG. 2 is stored in the video information memory 50a in the storage unit 50. It is then checked whether the storage of the video A has been completed. If the storage of the video A has not been completed, the video A continues to be stored. Conversely, if the storage of the video A has been completed, it is checked whether the CHARACTER EDIT mode has been selected through the keyboard 40a in the signal input unit 40.

When it is discriminated that the CHARACTER EDIT mode has not been selected, it is checked whether the video B has been stored. When it is discriminated that the storage of the video B has been completed, it is checked whether the VIDEO EDIT mode has been selected through the keyboard 40a in the signal input unit 40. If it is discriminated that the VIDEO EDIT mode has been selected, it is checked whether the video A is to be displayed as shown in FIG. 4A. If so, the video A is displayed on the screen of the monitor.

Similarly, in the case where the video B is inputted earlier than the video A or where the videos A and B are stored in the unit of frame, the operation is performed in the same manner as mentioned above.

Namely, if it is discriminated that the storage of the video B has been completed, it is checked whether the CHARACTER EDIT mode has been selected. When it is discriminated that the CHARACTER EDIT mode has not been selected, the video A is stored. Then, if it is discriminated that the VIDEO EDIT mode has been selected, it is checked whether the ,video B is to be displayed as shown in FIG. 4B. If so, the video B is displayed on the screen of the monitor.

On the other hand, when it is discriminated that the video B has not been inputted, it is checked whether the video has been stored in the unit of frame. If it is discriminated that the video has been stored in the unit of frame, it is checked whether the CHARACTER EDIT mode has been selected.

The video editing step (S16 and S17) is performed after the video A or B stored in the video information memory 60a is displayed on the screen of the monitor. At this step, first, the position information to be edited is inputted through the tablet 40*b* in the signal input unit 40. In FIG. 5, the position information is designated by a cross. A video is moved according to the cross-shaped position information to be combined with a video to be edited.

The character editing step (S18–S22) is then performed. Namely, the presence of character information to be edited is displayed en the screen of the monitor, and it is checked whether the character information has been inputted through the tablet 40*b* in the signal input unit 40. When it is discriminated that the character information has been inputted, the inputted character information is inserted into a video to be edited. Then, the resultant picture is displayed on the screen of the monitor as shown in FIG. 7.

On the other hand, in the case where the CHARACTER EDIT mode is selected after the storing step, the character editing step is performed. In this case, characters are inserted into the video stored in the video information memory 60*a*.

Then, it is checked whether the user is satisfied with the resultant picture as shown in FIG. 7. If the user is not satisfied with the resultant picture, a message is displayed on the screen of the monitor to instruct the user to again apply the edit information, and newly inputted position information and/or character information is stored in the edit information memory 60*b*. Then, the video editing step and/or character editing step is repeatedly performed.

A light pen may be employed to apply the information directly on the screen of the monitor, instead of using the tablet and the electronic pen separately. Therefore, the signal input unit is not limited to the electronic pen and tablet.

As hereinbefore described, according to the present invention, the desired videos can readily be superimposed and the characters can simply be inserted into the video, according to the user's selection. Also, the stored composite video signal and the input composite video signal can be viewed simultaneously in the PIP manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for synthesizing videos, comprising;
   video signal processing means for separating a color signal from an input composite video signal, converting the separated color signal into a digital color signal, again converting the digital color signal into an analog color signal and encoding the analog color signal into a composite video signal;
   signal input means for inputting a signal corresponding to edit information so as to synthesize an edit video signal on a source video signal, to synthesize a character information on said source video signal, and/or to synthesize said character information on the synthesized edit and source video signals in accordance with a plurality of mode signals, respectively;
   control means for outputting a plurality of control signals so that the edit operation of the apparatus can be performed corresponding to the edit information in accordance With the plurality of mode signals, and then controlling the edit operation so that the edit status of the apparatus can be displayed on a monitor in accordance with the edit status mode, while editing;
   storage means for storing the digital color signal from said video signal processing means and the edit information from said signal input means under the control of said control means;
   a monitor for displaying the composite video signal from said video signal processing means and the input composite video signal on a screen thereof under the control of said control means; and
   printing means for printing an output signal from said storage means under the control of said control means.

2. An apparatus for synthesizing videos, as set forth in claim 2, wherein said control means repeatedly corrects tablet or an electronic pen for inputting the information.

3. An apparatus for synthesizing videos, as set forth in claim 4, wherein said control means repeatedly corrects the edit status by checking the edit mode.

4. An apparatus for synthesizing videos, comprising:
   video signal processing means for separating a color signal from an input composite video signal, converting the separated color signal into a digital color signal, again converting the digital color signal in an analog color signal and encoding the analog color signal into a composite video signal;
   switching means for selectively outputting one of the input composite video signal and the composite video signal from said video signal processing means so that the selected composite video signal can be displayed in a PIP manner;
   a monitor for displaying the composite video signal outputted from said switching means on a screen thereof;
   signal input means for inputting a signal corresponding to edit information so as to synthesize an edit video signal on a source video signal, to synthesize a character information on said source video signal or to synthesize said character information on the synthesized edit and source video signals in accordance with a plurality of mode signals, respectively;
   control means for outputting a plurality of control signals so that the edit operation of the apparatus can be performed corresponding to the edit information in accordance with the plurality of mode signals, and then controlling the edit operation so that the edit status of the apparatus can be displayed on a monitor in accordance with the edit status mode while editing;
   storage means for storing the digital color signal from said video signal processing means and the edit information from said signal input means under the control of said control means; and
   printing means for printing an output signal from said storage means under the control of said control means.

5. An apparatus for synthesizing videos, as set forth in claim 1, wherein said control means repeatedly corrects the edit status by checking the edit mode.

* * * * *

UNITED STATES PATENT AND TRADEMARK OFFICE
CERTIFICATE OF CORRECTION

PATENT NO. : 5,438,438
DATED : August 1, 1995
INVENTOR(S) : Kwang Yoon Lee

It is certified that error appears in the above-indentified patent and that said Letters Patent is hereby corrected as shown below:

Col. 1, line 6: "fin" should be --in--
Col. 1, line 29: after "circuit" delete ","
Col. 1, line 30: "signal s" should be --signals--
Col. 1, line 33: after "digital" delete ","
Col. 1, line 54: before "color" insert --digital--
Col. 1, line 58: after "encoded" insert --into--
Col. 2, line 44: "selection," should be --selection.--
Col. 4, line 15: "con%roller" should be --controller--
Col. 4, line 63: "which" should be --with--
Col. 5, line 51: "response-to" should be --response to--
Col. 5, line 54: "manner," should be --manner.--
Col. 6, line 7: "cap" should be --can--
Col. 6, line 56: ",video" should be --video--
Col. 7, line 8: "en" should be --on--

UNITED STATES PATENT AND TRADEMARK OFFICE
CERTIFICATE OF CORRECTION

PATENT NO. : 5,438,438
DATED : August 1, 1995
INVENTOR(S) : Kwang Yoon Lee

It is certified that error appears in the above-indentified patent and that said Letters Patent is hereby corrected as shown below:

Col. 8, line 2: "accordance With" should be --accordance with--

Col. 8, lines 19-20: "claim 2, wherein said control means repeatedly corrects" should be --claim 1, wherein said signal input means includes a--

Col. 8, line 22: "claim 4" should be --claim 1--

Col. 8, line 42: after "signal" add --,--

Col. 8, line 63: "claim 1" should be --claim 4--

Signed and Sealed this

Twenty-second Day of April, 1997

Attest:

Attesting Officer

BRUCE LEHMAN

*Commissioner of Patents and Trademarks*